Sept. 6, 1927.
G. E. DECKER
FLOW METER
Filed June 12, 1923
1,641,744
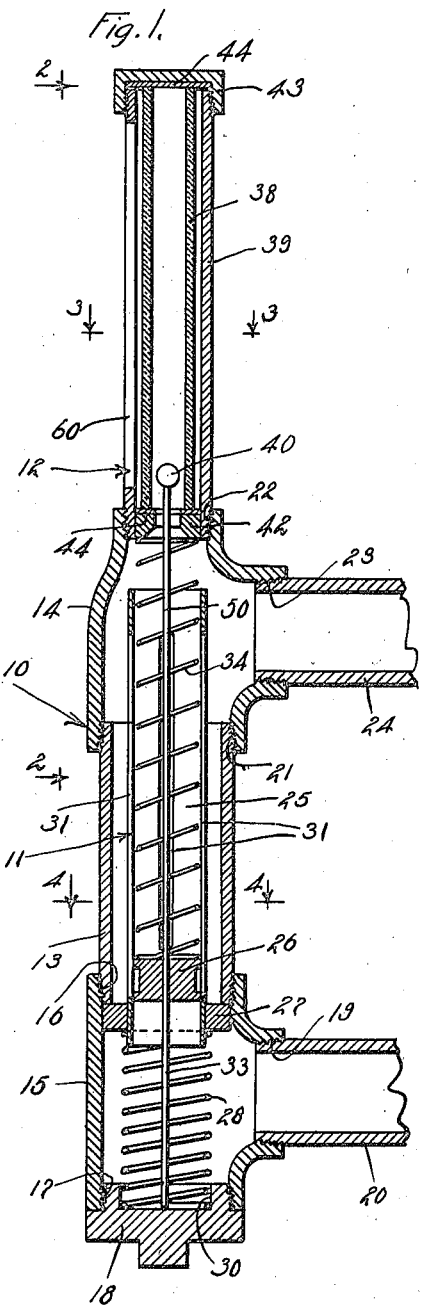
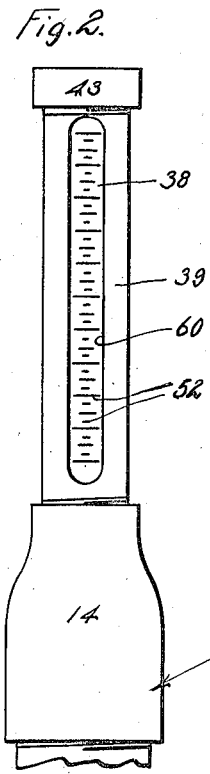
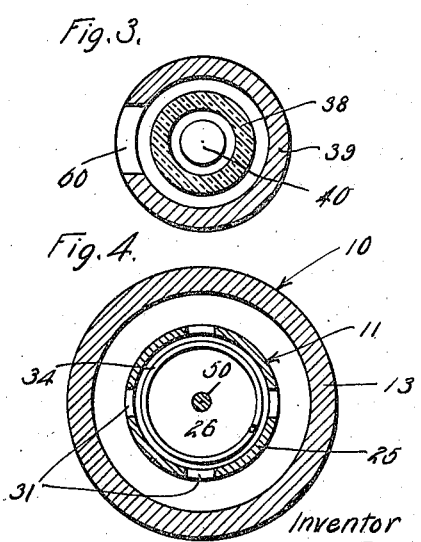
Inventor
George E Decker
by Wm H Malwell
his Attorney Patented Sept. 6, 1927.

1,641,744

UNITED STATES PATENT OFFICE.

GEORGE E. DECKER, OF LOS ANGELES, CALIFORNIA.

FLOW METER.

Application filed June 12, 1923. Serial No. 644,877.

This invention has to do with a meter, and more particularly to a meter for indicating and measuring the flow of fluid. It is an object of this invention to provide a meter of the character above specified which is simple, effective and reliable.

It is an object of this invention to provide an effective flow meter which is extremely simple and inexpensive of construction.
It is another object of this invention to provide a flow meter which can be quickly and conveniently cleaned or taken apart for the purpose of repair or replacement of parts.
The various objects and features of my invention will be best and more fully understood from the following detailed description of a typical preferred form of the invention, throughout which description reference is had to the accompanying drawings, in which:

Fig. 1 is a vertical detail sectional view showing my improved meter;

Fig. 2 is a front elevation of the upper portion of the meter, being a view taken as indicated by the line 2—2 on Fig. 1;

Fig. 3 is an enlarged detail section, taken as indicated by the line 3—3 on Fig. 1; and Fig. 4 is an enlarged detail plan section, taken as indicated by the line 4—4 on Fig. 1.

The meter provided by this invention may be used to indicate and measure the flow of various fluids, it being particularly suited to measuring and indicating the flow of liquids such as water. I have, therefore, herein set forth a form of the invention particularly suited for handling water, it being understood, of course, that this is merely a typical form of the invention and that it is not to be considered in any way as a limitation of the invention to handling any specific fluid.

The meter provided by the invention includes, generally, a body 10; a cylinder and piston mechanism 11, carried by the body and adapted to be actuated by flow of fluid through the body; and indicating means 12 for indicating actuation of the cylinder and piston mechanism.
The body 10 includes a tubular middle part 13, and upper and lower end parts 14 and 15, respectively. The lower end part 15 has an opening 16 at its upper end to receive the lower end of the middle part 13, has an opening 17 at its lower end opposite the opening 16, and has an intake opening 19 in one side to receive fluid from the conduit 20. The opening 16 is closed by a suitable plug 18. The upper end part 14 has an opening 21 in its lower end to receive the upper end of the middle part 13, an opening 22 in its upper end opposite the opening 21 to receive and carry a part of the indicating means 12, as will be hereinafter described, and an outlet opening 23 in its side to discharge fluid from the body to the fluid conduit 24. The body 10 forms a connection between the fluid conduits 20 and 24 which will conduct fluid from the conduit 20 to the conduit 24. From the foregoing description, and from inspection of the drawings, it will be obvious that the body 10 is extremely simple and inexpensive in construction. In practice the middle part 13 may be formed of a piece of pipe, while the ends 14 and 15 may be standard T's.

The cylinder and piston mechanism includes a cylinder 25 mounted in the body 10 so that fluid flowing through the body flows through it, and a piston 26 slidably carried in the cylinder so that it is operated upon by fluid flowing through the cylinder. The cylinder 25 is mounted in the body 10 so that it extends longitudinally through the body. In the form of construction illustrated in the drawings a collar 27 is fixed on the lower end portion of the cylinder 25, and is arranged in the lower end part 15 of the body against the lower end of the middle part 13. The collar makes a tight joint between the cylinder and lower end of the middle part 13 and carries the cylinder 25 so that it extends freely through the middle part 13 and into the upper end part 14. The collar 24 is held in seated engagement with the lower end of the middle part 13 by a helical spring 28 arranged between the collar 27 and the plug 18. The spring 28 is held in the proper position with relation to the collar and plug by a socket 30 in the plug, which receives the lower end of the spring, and the lower end of the cylinder, which projects downwardly from the collar into the upper end of the spring. With the construction just described all the fluid entering the lower end part 15 from the conduit 20 must pass or flow into the cylinder 25 in order to pass through the body to the conduit 24.

The piston is preferably made sufficiently large so that it operates freely in the cylinder without binding. In practice I provide an annular recess in the piston between its ends to catch any foreign material that works between the piston and cylinder and which might tend to bind the piston if it had a long bearing surface. The normal or unactuated position of the piston is at the lower end of the cylinder. The fluid that flows into the lower end of the cylinder 25 from the end part 15 of the body operates on the piston to move it upwardly in the cylinder or to hold it in a raised position in the cylinder. The fluid escapes from the cylinder into the middle and upper end parts of the body through openings 31 formed through the sides of the cylinder. In the particular form of the invention illustrated in the drawings the openings are in the form of slots that extend longitudinally of the cylinder from points near its lower end to points near its upper end. The openings 31 are located, however, so that they are all above the lower end of the piston when the piston is in its unactuated position causing the piston to be actuated by the slightest flow of fluid through the device. In the device illustrated in the drawings there are four slots 31 formed in the cylinder, two of them extending downwardly further than the others. This causes the piston 26 to be moved a comparatively great amount by slight changes in flow when the flow is slight. It will be obvious, of course, that the piston may be made to move various amounts by changes in the flow through the device by varying the sizes, shapes and arrangement of the openings 31.

A rod 33 extends downwardly from the piston 26 and engages the plug 18 to limit the downward movement of the piston and to support the piston in its unactuated position. It is further desirable to provide means for limiting the upward movement of the piston in the cylinder and for cushioning the piston at the upper end of its movement. This may be done by arranging a spring 34 in the cylinder above the piston so that it compresses between the piston and a suitable stationary part upon the piston approaching the upper end of its movement. In the drawings I have shown the spring 34 sufficiently long so that it extends between the stationary part and the piston when the piston is in its down or unactuated position and, therefore, operates to return the piston to its unactuated position. When the device is used in a vertical position, as I have illustrated in the drawings, the spring may be made shorter than I have shown it in the drawings as the piston will be returned to its unactuated position by gravity, however, if it is operated in another position it is desirable to make the spring 34 as I have illustrated it in the drawings to assure return of the piston to its unactuated position.

The indicating means 12 includes a gauge glass 38, a carrier 39 for the gauge glass, and an indicating part 40 operatively connected with the piston 26. The carrier 39 may be a metal tube screw threaded in the opening 22 provided in the upper end of the upper end part 14 of the body 10. The carrier 39 has a ring 42 tightly carried in its lower end to form a seat for the lower end of the gauge glass 38. The gauge glass is arranged in the carrier so that it is supported by the ring 42 and a cap 43 is screw threaded onto the upper end of the carrier so that it engages the upper end of the gauge glass to close it and to hold the gauge glass in position in the carrier. Suitable washers 44 are arranged at the ends of the gauge glass in the manner clearly illustrated in Fig. 1. The indicating part 40 is arranged in the gauge glass, and, although it may be operatively connected with the piston 26 in various manners, it is preferably carried by a rod 50 which extends upwardly from the piston 26 through the cylinder, through the ring 42 and into the gauge glass. The rod 50 may be continuous with the rod 33, as I have illustrated in the drawings. The indicating part 40 being thus connected with the piston 26 is moved upwardly through the gauge glass as the piston is moved upwardly in the cylinder by the flow of fluid through the frame. A sight opening 60 is provided in the carrier 39 so that the indicating part can be seen in the gauge glass. Suitable graduations 52 may be provided on a part of the indicating means, for instance, on the gauge glass, as I have illustrated in Fig. 2, to facilitate reading the position of the indicating part in the gauge glass. The rod 50 fits loosely through the ring 42 so that fluid can enter the gauge glass from the body 10.

In operation the device is connected with the desired fluid conduits 20 and 24 in substantially the manner illustrated in Fig. 1, so that fluid flows into the lower end of the body from one of the conduits and is conducted away from the upper end of the body by the other conduit. The fluid that enters the lower end of the body 10 must flow into the lower end of the cylinder 25, and, therefore, actuate the piston 26. The actuation of the piston is indicated by the position of the indicating part 40 in the gauge glass 38. The fluid discharges from the cylinder through the openings 31 and is conducted by the middle part 13 and end part 14 of the body to the conduit 24. Fluid from the frame enters the gauge glass through the ring 42 so that fluid appears in the gauge glass when there is fluid in the device. With the construction provided by the present invention the device can be very easily and quickly taken apart for the purpose of cleaning, repairing, or replacement of parts. To remove the cylinder and piston mechanism and to clean the frame of the device it is merely necessary to remove the plug 18, and withdraw the cylinder and piston mechanism from the body through the opening 17. To clean the indicating means or to make a replacement, for instance, to replace the gauge glass 38, it is usually only necessary to remove the cap 43, however, the entire indicating means, except for the indicating part 40, may be removed by detaching the carrier 39 from the upper end part 14 of the frame.

Having described only a typical preferred form of my invention I do not wish to limit myself to the specific details hereinabove set forth but wish to reserve to myself any changes or variations that may appear to those skilled in the art or fall within the scope of the following claims.

Having described my invention, I claim:

1. In a fluid meter of the character described, a hollow body with lateral openings to receive two fluid conduits so that the body connects the conduits, the body having openings in its upper and lower ends, a removable plug for the opening in the lower end of the body, a gauge glass connnected with the opening in the upper end of the body to extend upwardly from the body, a closure for the upper end of the gauge glass, a cylinder mounted in the body so that it is removable from the body through the opening in the lower end of the body when the plug is removed, the cylinder having one end connected with the body so that fluid passing through the body enters the cylinder and having openings adapted to be uncovered proportionally to the upward movement of the piston to allow the escape of fluid, a piston carried in the cylinder to be actuated by flow of fluid through the cylinder, an indicating part carried in the gauge glass, and an operating connection between the piston and the indicating part.

2. In a meter of the character described, a hollow body with lateral openings to receive two fluid conduits so that the body connects the conduits, the body having openings in its upper and lower ends, a removable plug for the opening in the lower end of the body, a gauge glass connected with the opening in the upper end of the body to extend upwardly from the body, a closure for the upper end of the gauge glass, a cylinder mounted in the body so that it receives the fluid flowing through the body and so that it is removable from the body through the opening in its lower end when the plug is removed, the cylinder having longitudinal openings adapted to be uncovered proportionally to the upward movement of the piston to allow fluid to escape, a piston carried in the cylinder, a spring arranged between the plug and cylinder to hold the cylinder in place, an indicating part carried in the gauge glass, and a rod extending upwardly from the piston and connecting with the indicating part.

3. In a fluid meter of the character described, a body including a middle part, and upper and lower end parts, the lower end part having an opening in its upper end to receive the lower end of the middle part, an opening in its lower end, and an intake opening in its side to connect with a fluid conduit, the upper end part having an opening in its lower end to receive the upper end of the middle part, an opening in its upper end, and an outlet opening in its side, a plug removably carried in the opening in the lower end of the lower end part, a cylinder and piston mechanism carried by the body and removable through the opening in the lower end of the lower end part, said cylinder having an opening in its side, said piston being slidably carried in the cylinder and normally positioned to cut off communication between the middle and lower parts, and a collar adjacent the lower end of the cylinder adapted to engage the lower end of the middle part to thereby suport the cylinder freely in the body, a spring interposed between the collar and plug to hold the collar in engagement with the middle part, a gauge glass, a carrier for the gauge glass closing its upper end and carried by the upper end part, the carrier having a sight opening therein, an indicating part in the gauge glass, a rod extending upwardly from the piston into the gauge glass and connecting with the indicating part, and a spring interposed between the piston and upper end part to maintain said piston in normal position when there is no flow through the device.

In witness that I claim the foregoing I have hereunto subscribed my name this 4th day of June 1923.

GEORGE E. DECKER.